United States Patent Office 3,094,520
Patented June 18, 1963

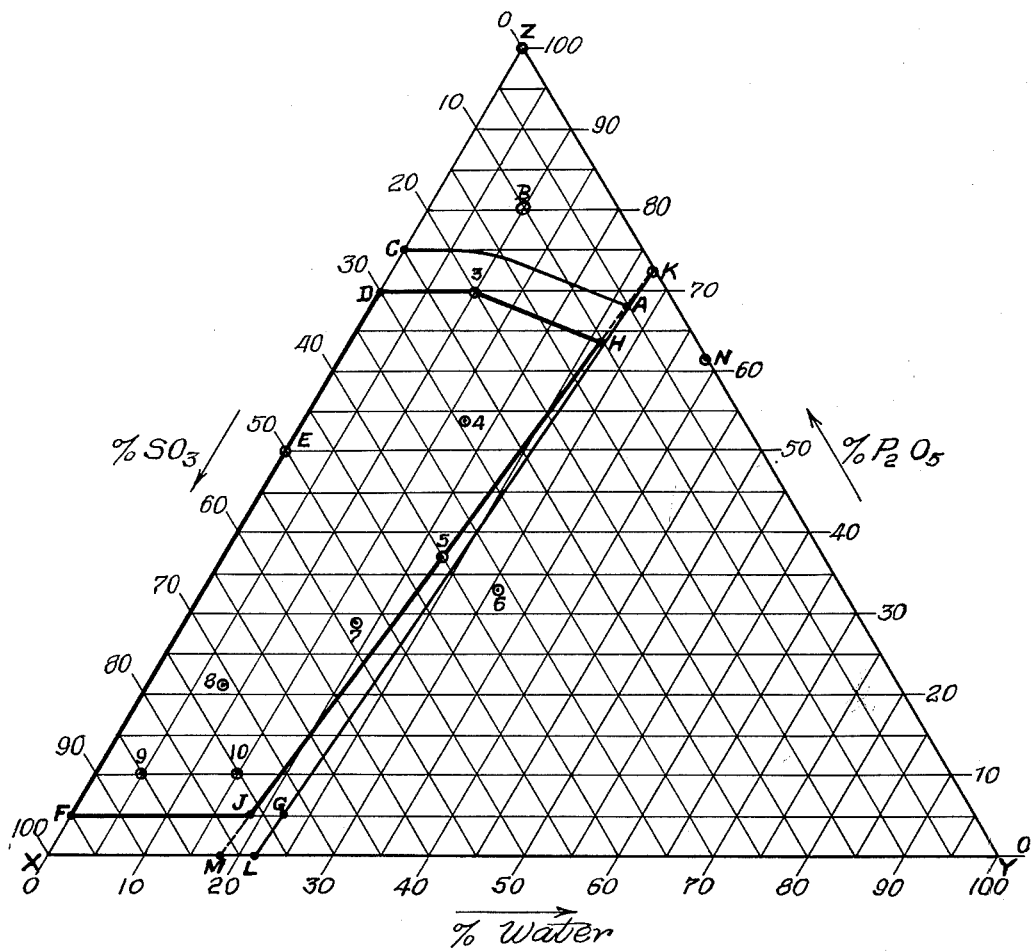

3,094,520
PROCESS FOR PRODUCING LACTAMS
Thomas R. Hopkins, Johnson County, Kans., assignor to Spencer Chemical Company, Kansas City, Mo., a corporation of Missouri
Filed May 28, 1959, Ser. No. 816,542
6 Claims. (Cl. 260—239.3)

This invention relates to the production of lactams. More particularly, this invention relates to the production of lactams by the Beckmann rearrangement of alicyclic oximes, and especially cyclohexanone oxime, in the presence of a mixture of sulfuric and phosphoric acids containing not more than 3% free water, or mixed sulfuric and phosphoric hetero anhydrides, and their reaction products.

In the usual procedure for preparing lactams by the Beckmann rearrangement of alicyclic oximes such as cyclohexanone oxime and cyclopentanone oxime, the rearrangement is effected by heating the oxime in concentrated sulfuric acid (96% $H_2SO_4$) or concentrated sulfuric acid containing excess sulfur trioxide, commonly known as oleum. However, the lactams obtained by this rearrangement usually have an objectionable color and other impurities which are very difficult to remove. The lactam so produced is commonly isolated by first diluting the reaction mixture with water, neutralizing with a base such as ammonium hydroxide, and then extracting the lactam with a suitable solvent. The by-product, ammonium sulfate, is isolated by removal of the water from the aqueous residue. This by-product, while useful as a fertilizer, is in surplus supply.

Other investigators have suggested using sulfur trioxide as the rearrangement catalyst; however, when using this catalyst, it is necessary to effect the rearrangement at low temperatures such as about 0° to —20° C. in order to avoid decomposition of the lactam by the catalyst or the solvent system.

It has been reported by Horning et al., J. Am. Chem. Soc. 74, 5153-5 (1952) that polyphosphoric acid is a suitable rearrangement catalyst for oximes. In one example, cyclohexanone oxime was rearranged to epsilon-caprolactam in 89% yield. However, polyphosphoric acid, which is a mixture of phosphoric acid anhydrides usually prepared by concentrating orthophosphoric acid, is a relatively expensive rearrangement medium.

It has been found, according to the present invention, that the rearrangement of alicyclic oximes can be effected by using a catalyst comprising mixed sulfuric and phosphoric anhydrides containing hetero anhydrides, or acids containing not more than 3% free water, to produce lactams in high yields and higher purity and that the rearrangement catalyst is less expensive than polyphosphoric acid.

An added important advantage of this rearrangement catalyst system is the superior by-product obtained by neutralization of the catalyst mixture with ammonium hydroxide after removal of the lactam. This results in destruction of the hetero anhydrides and gives a mixture of ammonium sulfates and ammonium phosphates which are extremely valuable as fertilizers.

The term "free water" as used herein means water which is not combined with the anhydrides of the catalyst compositions to form additional phosphoric or sulfuric acids.

The exact chemical composition of the catalyst mixtures is not known, since the system appears to form complex mixtures of hetero anhydrides. In certain systems of the type A—B—C where A and B are anhydrides and C is a third component such as water, hetero anhydrides are formed within certain concentration ranges, usually when there is no free water present. This is normally expected to occur when A and B are strong inorganic anhydrides. These hetero anhydrides are complex and can consist of several individual species. The complexity of these systems can be demonstrated by reference to the two component systems $P_2O_5$—$H_2O$ or $SO_3$—$H_2O$. These systems have been studied and the existence of several anhydride species is well known in each case. The introduction of a third component to either of the systems allows a wide range of new anhydrides to be prepared. Very few of these three component systems have been studied. Only one of the species of the system $SO_3$—$P_2O_5$—$H_2O$ has been described previously. It has been reported by Adie, J. Chem. Soc. 59, 230 (1891), that the addition of phosphorus acid to $SO_3$ gives a light brown colored liquid which may be described as phosphonyl hydrosulfide $(PO(SO_4H)_3)$ and which is hydrolyzed to phosphoric acid and sulfuric acid upon the addition of water. It is believed that the catalyst compositions of this invention contain some of the $PO(SO_4H)_3$ described by Adie. Point 8 on the accompanying ternary diagram represents a composition corresponding to $PO(SO_4H)_3$.

The rearrangement catalyst mixtures of this invention are best described by the system $SO_3$—$P_2O_5$—$H_2O$ within the limits set out by the accompanying ternary diagram. It is thought that this system contains a wide variety of anhydrides including the anhydrides of sulfuric and phosphoric acids, as well as their reaction products such as the mixed anhydrides of sulfuric and phosphoric acids. For convenience, these anhydride mixtures are referred to herein as "hetero anhydrides" which is meant to include the anhydrides of sulfuric and phosphoric acids as well as their reaction products which may be the mixed anhydrides of sulfuric and phosphoric acid.

Referring now to the accompanying drawing, shown therein is a ternary or triangular coordinate diagram illustrating the composition of rearrangement catalyst mixtures useful in the process of rearranging alicyclic oximes coming within the scope of the present invention.

The three coordinates of the ternary diagram represent $SO_3$ which is present in increasing quantities along lines parallel to and progressively removed from the 0% $SO_3$ axis YZ; water which is present in increasing quantities along lines parallel to and progressively removed from the 0% water axis XZ; and phosphorus pentoxide which is present in increasing quantities along lines parallel to and progressively removed from the 0% $P_2O_5$ axis XY. The reading of such ternary diagrams is well known in the art.

Compositions corresponding to 100% and 85% phosphoric acid are plotted as points K and N, respectively. Compositions corresponding to 100% and 96% sulfuric acid are plotted as points M and L, respectively.

The $SO_3$—$P_2O_5$—$H_2O$ compositions suitable for rearranging alicyclic oximes are found in the regions approximately enclosed by the line in the triaxial diagram passing through points ACDEFJGHA, containing about 5% to 95% $SO_3$, and 5% to 75% $P_2O_5$ and about 0% to 27% $H_2O$ with all percentages being on a weight basis.

Preferred compositions giving high yields of lactam of high purity are within the lesser region bounded by the line passing through points DEFJ5H3D containing about 10% to 95% $SO_3$, 5% to 70% $P_2O_5$ and 0% to 26% water. In the region above the line passing through points CAK, very little or no rearrangement is obtained by the catalyst compositions represented in this area except for phosphoric acid anhydrides. The compositions represented by the area below the line passing through LGHAK give unsatisfactory or no yield of lactam when utilized as a catalyst mixture. The compositions encompassed in this area contain more than 3% free water The valuable utility of these catalyst mixtures is especially surprising since it was found that 100% phosphoric acid containing no $SO_3$, and thus no hetero anhydrides, is unsuitable as an alicyclic oxime rearrangement catalyst, as for example it gives only about 40% conversion of cyclohexanone oxime. It has also been found that $P_2O_5$ containing no $SO_3$ or water is unsuitable as a rearrangement catalyst, giving no lactam.

The catalyst mixtures of this invention can be prepared conveniently by several procedures. Commercial phosphoric acid (85%) may be treated with sulfur trioxide to give a hetero anhydride composition which is a very effective rearrangement catalyst mixture. Alternatively, when commercial concentrated sulfuric acid (96%) is treated with phosphorus pentoxide, a suitable rearrangement catalyst results. Oleum also can be treated with phosphorus pentoxide to give a suitable catalyst mixture. In addition, 100% phosphoric acid ($H_3PO_4$) can be combined with 100% sulfuric acid ($H_2SO_4$) to give a suitable rearrangement catalyst mixture.

Thus, either dilute phosphoric acid or dilute sulfuric acid may be treated with sulfur trioxide or phosphorus pentoxide, respectively, to give a superior rearrangement catalyst mixture containing not more than 3% free water. Because of their commercial availability, phosphoric acids containing about 60% to 72% by weight of $P_2O_5$ can be conveniently treated with sulfur trioxide, and similarly, sulfuric acid containing 30% to 80% by weight of $SO_3$ can be treated with $P_2O_5$ to reduce the free water content to below the 3% maximum tolerated.

The rearrangement is conveniently effected by contacting a mixture of the alicyclic oxime and the catalyst system at a rearrangement temperature, such as at a temperature of about 80°–120° C. The rearrangement temperature can be efficiently controlled by employing a solvent for the oxime which is a dispersant for the catalyst and which boils at about the required rearrangement temperature. One suitable solvent which can be used is 1,2-dichloroethane. A ratio of about 1 to 2 moles of catalyst to 1 mole of oxime may be suitably employed.

The lactam may be isolated by extraction with a suitable solvent after neutralizing the reaction product mixture with a base such as ammonium hydroxide. Removal of the solvent by distillation gives the crystalline lactam. Removal of the water from the neutralized aqueous residue gives a crystalline mixture of ammonium salts of sulfuric and phosphoric acids which is valuable as a fertilizer to provide nitrogen and phosphorus to deficient soils.

The following examples are presented in order to further explain the invention but are not to be considered to limit the invention. The catalyst composition described in each example is plotted on the ternary diagram. All percentages given are on a weight basis.

*Example 1*

To 13.5 g. of 85% phosphoric acid was added dropwise 15.5 g. of sulfur trioxide at ambient temperature. The resulting mixture was equivalent to a composition containing 53% $SO_3$, 29% $P_2O_5$ and 18% water as plotted on the ternary figure at the point 7.

1,2-dichloroethane (50 ml.) was added to the catalyst mixture and the solution then heated to reflux (about 80°–84° C.). Cyclohexanone oxime (25 g.) dissolved in 30 ml. of warm dichloroethane was then added with stirring over a period of about 20 minutes. There was a slight rise in temperature during the oxime addition. The resulting solution was then refluxed for an additional 30 minutes. The solvent was removed by distillation under reduced pressure and the light brown coloed residue added slowly to 100 g. of concentrated ammonium hydroxide while cooling in a Dry-Ice-methanol bath. The neutralized solution was then extracted with four 200 ml. portions of chloroform, the combined chloroform extracts distilled to dryness under reduced pressure and the residue dried at 60° C. in a vacuum oven over phosphorus pentoxide to a constant weight of 23.7 g., M.P. 67°–70° C. Recrystallization of the product from ligroin gave 22.9 g. of pure epsilon-caprolactam melting at 69°–71° C., corresponding to a 92% yield.

The aqueous solution of neutralized catalyst was distilled to dryness under reduced pressure and the orange crystalline residue dried in a desiccator over $P_2O_5$. The crystalline material weighed 41.6 g. and was found by analysis to contain 19.9% nitrogen, 5.0% phosphorus and 15.69% sulfur.

*Example 2*

To 13.2 g. of 85% phosphoric acid in a 200 ml. flask was added 8.8 g. of sulfur trioxide. The resulting composition was equivalent to a mixture of 11.2 g. of 100% phosphoric acid and 10.8 g. of 100% sulfuric acid or 40% $SO_3$, 37% $P_2O_5$, and 23% water. Point 5 on the ternary diagram represents the catalyst composition of this example.

The catalyst mixture was cooled to about 40° C. and 50 ml. of 1,2-dichloroethane added. The catalyst mixture was then heated to reflux and 18.3 g. of cyclohexanone oxime dissolved in 30 ml. of dichloroethane was added dropwise with stirring over a period of about 20 min. The mixture was refluxed for an additional 30 min. after the addition of the oxime. The solvent was removed by distillation under reduced pressure and the residue added to 100 g. of cool ammonium hydroxide. The neutralized solution was then extracted with several portions of chloroform and the combined chloroform extracts distilled to dryness under reduced pressure. The residue was dried in a vacuum desiccator over $P_2O_5$ to a constant weight of 17.8 g. The crystalline epsilon-caprolactam melted at 68°–71° C. and was shown by infrared analysis to contain no oxime. This represented a 97.2% yield of epsilon-caprolactam.

The aqueous solution of ammonium salts was distilled to dryness under reduced pressure and the residue dried to a constant weight in a vacuum desiccator over $P_2O_5$. The resulting ammonium salts weighed 30.2 g. and were found by analysis to contain 18.0% nitrogen, 10.8% phosphorus and 12.2% sulfur.

*Example 3*

To 27.6 g. of concentrated sulfuric acid (96%) which had been diluted with 7 g. of distilled water was added 39.6 g. of phosphorus pentoxide. The resulting mixture, which was equivalent to a mixture of polyphosphoric acid and 100% sulfuric acid or 29% $SO_3$, 53.5% $P_2O_5$ and 17.5% water on a weight basis, is plotted as point 4 on the accompanying ternary figure. To 37.1 g. of the acid mixture in a 300 ml. flask was added 50 ml. of 1,2-dichloroethane. The resulting mixture was stirred and heated to reflux and a solution of 33.1 g. of cyclohexanone oxime dissolved in 50 ml. of 1,2-dichloroethane was added dropwise over a period of about 20 min. The resulting mixture was refluxed for an additional 30 min. and the solvent then removed by distillation under reduced pressure. The residue was added to cold concentrated ammonium hydroxide and the neutralized catalyst extracted with several portions of chloroform. The combined chloroform extracts were distilled to dryness under reduced pressure and the residue dried in a vacuum desiccator over $P_2O_5$ to a constant weight of 30.7 g., M.P. 64°–66° C. This corresponds to a 93% yield of epsilon-caprolactam which was shown to contain no oxime by infrared analysis. The aqueous solution of neutralized acidic catalyst was distilled to dryness under reduced pressure to give 54.2 g. of mixed ammonium salts.

*Example 4*

To 13.2 g. of 85% phosphoric acid in a 200 ml. flask was added 11.3 g. of concentrated sulfuric acid (96%) with stirring. The resulting mixture contained 36% $SO_3$, 33% $P_2O_5$ and 31% water and is plotted as point 6 on the accompanying ternary diagram. The acid mixture was then stirred with 50 ml. of 1,2-dichloroethane and heated to reflux. To the refluxing acid solution was added dropwise 18.3 g. of cyclohexanone oxime dissolved in 30 ml. of dichloroethane over a period of about 20 min. Refluxing was continued for an additional 30 min. The dichloroethane was removed by distillation under reduced pressure and the residue then added to 100 g. of cooled concentrated ammonium hydroxide. The neutralized solution was extracted with several portions of chloroform and the combined chloroform extracts distilled to dryness under reduced pressure. The crystalline residue was dried in a vacuum desiccator to a constant weight of 17.4 g., M.P. 81°–86° C. Infrared analysis showed that the product contained no epsilon-caprolactam, but was crude cyclohexanone oxime. This represents a 95% recovery of crude oxime.

*Example 5*

To 4.3 g. of concentrated sulfuric acid (96%) was added with stirring 14.1 g. of polyphosphoric acid and then an additional 15.0 g. of phosphorus pentoxide was added. The catalyst mixture was equivalent to 10% $SO_3$, 80% $P_2O_5$ and 10% water by weight and is plotted as point B on the accompanying ternary diagram. The crystalline mass was stirred with 50 ml. of 1,2-dichloroethane, heated to reflux and a dichloroethane solution of cyclohexanone oxime (33.7 g.) added as described in the previous examples. Isolation of the caprolactam by the usual procedure gave 5.1 g. of pure epsilon-caprolactam melting at 67°–69° C., corresponding to a 15.1% yield.

*Example 6*

To a mixture of 8.8 g. of polyphosphoric acid and 8.5 g. of concentrated sulfuric acid (96%) was added, at 70° C., 16.0 g. of $P_2O_5$. The catalyst mixture was equivalent to 20% $SO_3$, 70% $P_2O_5$ and 10% water by weight and is plotted as point 3 on the accompanying ternary diagram. Fifty ml. of 1,2-dichloroethane was added, the mixture heated to reflux and a solution of oxime (33.1 g.) added as described above. Isolation of the epsilon-caprolactam by the usual procedure gave 12.2 g. of crude lactam melting at 66°–68° C., corresponding to a 37% yield.

*Example 7*

To a stirred solution of 7.7 g. of 96% sulfuric acid was added, at 60° C., 3.3 g. of phosphorus pentoxide. Fifty ml. of 1,2-dichloroethane was added to the mixture and then 22.3 g. of liquid sulfur trioxide added. The resulting catalyst mixture was equivalent to 85% $SO_3$, 10% $P_2O_5$ and 5% water by weight and is plotted as point 9 on the accompanying ternary diagram. Cyclohexanone oxime (32.3 g.) was rearranged with the catalyst mixture by the procedure of Example 4 to give 31.3 g. of pure epsilon-caprolactam melting at 69°–71° C., corresponding to a 97% yield.

*Example 8*

To a mixture of 3.3 g. of $P_2O_5$ and 23.1 g. of 96% sulfuric acid in 50 ml. of 1,2-dichloroethane was added dropwise 6.9 g. of liquid sulfur trioxide. The resulting catalyst mixture was equivalent to 75% sulfur trioxide, 10% $P_2O_5$ and 15% water by weight and is plotted on the accompanying ternary diagram as point 10. Cyclohexanone oxime (29.0 g.) was rearranged by the procedure of Example 4 to give 28.8 g. of pure epsilon-caprolactam melting at 69°–70.5° C., corresponding to a 99.5% yield.

*Example 9*

To a slurry of 16.7 g. of $P_2O_5$ in 50 ml. of 1,2-dichloroethane was added 16.7 g. of liquid $SO_3$. The resulting catalyst mixture was equivalent to 50% $SO_3$ and 50% $P_2O_5$ and is plotted on the accompanying ternary diagram as point E. Cyclohexanone oxime (35.8 g.) was rearranged by the procedure of Example 4 with the catalyst mixture to give 28.2 g. of brown crystalline material melting at 67°–69° C. corresponding to a 79% yield of crude epsilon-caprolactam.

*Example 10*

To 25 g. of 85% phosphoric acid in a 200 ml. flask was passed in sulfur dioxide until a constant weight was achieved. There was a gain in weight of only 0.9 g. Thus, the mixture contained at the most only 3.5% $SO_2$ and disregarding the negligible amount of $SO_2$, the catalyst can be considered to be plotted at approximately point N on the ternary diagram. Twenty-five ml. of 1,2-dichloroethane was added and the catalyst mixture heated to reflux. Cyclohexanone oxime (34.5 g.) dissolved in 60 ml. of dichloroethane was added to the refluxing catalyst mixture as described above. Neutralization with ammonium hydroxide and extraction with chloroform gave 34.1 g. of recovered cyclohexanone oxime melting at 89°–91° C. (99% recovery).

*Example 11*

To a stirred, refluxing mixture of 15.0 g. of phosphorus pentoxide and 30 ml. of chloroform was added 6 g. of cyclohexanone oxime dissolved in 25 ml. of chloroform. The catalyst (100% $P_2O_5$) is the same as point Z on the ternary diagram. No external heating was required to maintain the reflux temperature. The chloroform was removed by distillation under reduced pressure to give a white crystalline residue which was neutralized with concentrated ammonium hydroxide and then extrated with several portions of chloroform. The combined chloroform extracts were distilled to dryness under reduced pressure to give 5.5 g. of an oily residue from which no crystalline caprolactam could be isolated.

*Example 12*

To 79.1 g. of phosphorus pentoxide was slowly added with cooling 200 g. of 85% phosphoric acid. After standing overnight, the mixture was heated slightly to dissolve the remaining phosphorus pentoxide. This mixture, which contained 72.5% phosphorus pentoxide and 27.5% water is equivalent to 100% phosphoric acid and is plotted as point K on the ternary diagram. A portion of the phosphoric acid mixture (150.0 g.) was heated to 110° C. and then 132.7 g. of molten cyclohexanone oxime was added drop-wise at such a rate as to maintain a temperature of about 110°–155° C. The dark reaction product mixture was poured slowly into 150 ml. of water containing 200 ml. of approximately 20% ammonium hydroxide at about —10° to 20° C. The resulting solution, which had separated into two layers, was separated and the lower aqueous salt phase was extracted five times with a total of 500 ml. of chloroform. The combined chloroform extracts were added to the upper lactam phase and the resulting water layer was separated and back-extracted. The combined chloroform extracts were washed twice with a small amount of saturated aqueous sodium chloride solution made basic with a small amount of sodium hydroxide. The chloroform extract was decolorized by two treatments with decolorizing charcoal and distilled to dryness to give a residue of dark brown solid melting at 59°–69° C. Recrystallization from ligroin yielded 53.2 g. of yellow, crude epsilon-caprolactam melting at 61°–68° C. This represented a 40% conversion to crude epsilon-caprolactam.

Various changes and modifications of the invention can be made and, to the extent that such variations incorporate the spirit of this invention, they are intended to be included within the scope of the appended claims.

What is claimed is:

1. A process of producing a lactam by the rearrangement of an alicyclic oxime which comprises contacting said oxime with a catalyst composition in the liquid phase at an elevated temperature which rearranges the oxime to a lactam and separating the lactam so produced from the reaction mixture, said catalyst composition being formed by admixing (a) a member of the group consisting of sulfuric acid, sulfur trioxide and mixtures thereof, with (b) a member of the group consisting of phosphoric acid, phosphorus pentoxide and mixtures thereof, in such proportions to provide a catalyst composition having a $P_2O_5$—$SO_3$—$H_2O$ analysis lying within the area bounded by the line passing through points ACDEFJGHA on the accompanying ternary diagram.

2. The process of claim 1 in which said elevated temperature is in the range of about 80° C. to 120° C.

3. The process of claim 2 in which said catalyst composition is dispersed in an organic solvent for said oxime.

4. The process of claim 1 in which said catalyst composition has a $P_2O_5$—$SO_3$—$H_2O$ analysis lying within the area bounded by the line passing through points DEFJ5H3D on the accompanying ternary diagram.

5. The process of claim 1 in which said catalyst composition is formed by admixing phosphoric acid with sulfur trioxide.

6. A process of producing caprolactam by the rearrangement of cyclohexanone oxime which comprises contacting said oxime in the liquid phase at a temperature of about 80° C. to 120° C. with a rearrangement catalyst composition formed by admixing phosphoric acid with sulfur trioxide in such proportions to provide a catalyst composition having a $P_2O_5$—$SO_3$—$H_2O$ analysis lying within the area bounded by the line passing through points DEFJ5H3D on the accompanying ternary diagram, and separating the caprolactam so produced from the reaction mixture.

References Cited in the file of this patent

UNITED STATES PATENTS 2,351,381　Wiest _____ June 13, 1944

FOREIGN PATENTS 920,072　Germany _____ Nov. 11, 1954

OTHER REFERENCES

Karrer: Organic Chemistry, 4th ed., p. 750 (1949).

Horning et al.: J. Am. Chem. Soc., vol. 74, pp. 5153–5 (1952).

Houben-Weyl: Methoden der Organischen Chemie, Band 11/2, pp. 550–54 (Gerog Thieme Verlag) (Stuttgart) (1955).